Figure 1:
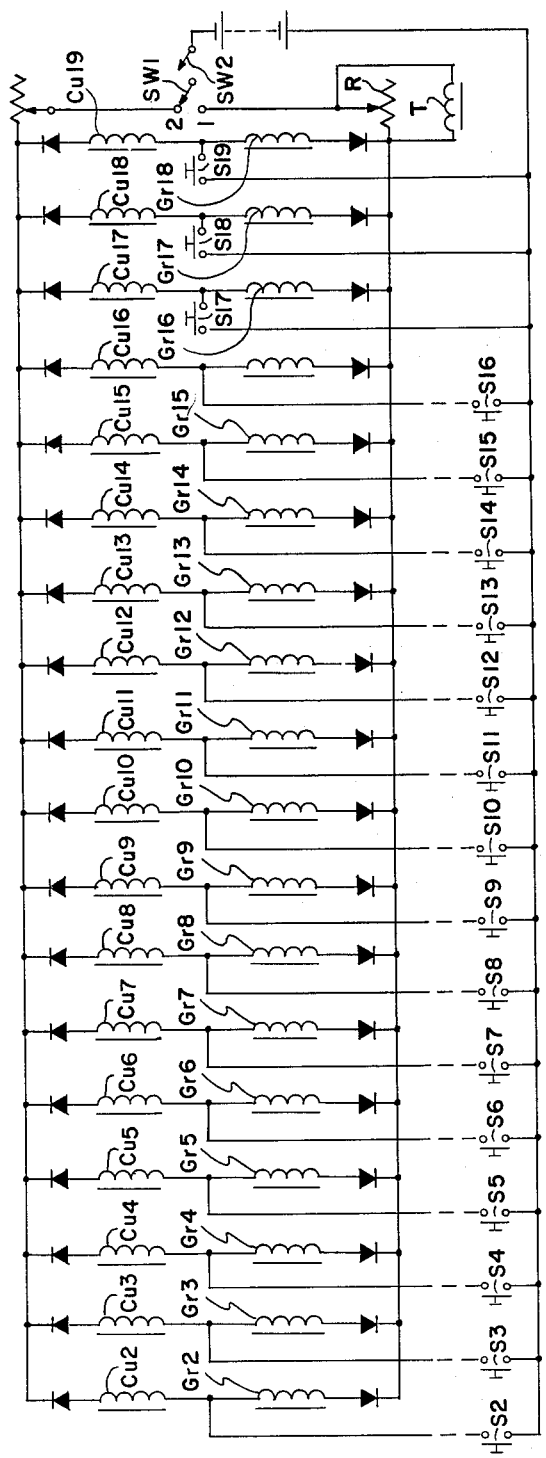

Dec. 1, 1964   W. H. MARTIN ETAL   3,159,342
MEASURING APPARATUS AND METHOD OF USING
Filed June 22, 1961   2 Sheets-Sheet 1

WILLIAM H. MARTIN
HENRI G. SIMARD

*INVENTORS*

BY

ATTORNEY

WILLIAM H. MARTIN
HENRI G. SIMARD
INVENTORS

United States Patent Office 3,159,342
Patented Dec. 1, 1964

3,159,342
MEASURING APPARATUS AND METHOD OF USING
William H. Martin, Rosemere, Quebec, and Henri G. Simard, Montreal, Quebec, Canada, assignors to Canadian International Paper Company, Montreal, Quebec, Canada, a corporation of Canada
Filed June 22, 1961, Ser. No. 118,984
1 Claim. (Cl. 235—92)

The present invention relates to volume measurement. More particularly, it relates to an electric apparatus and a method useful in the volumetric measurement of pulpwood.

Conventionally, pulpwood is cut in the forest in lengths of four, eight, twelve, or sixteen feet. Generally, only one length will be cut during any one operation, so as to permit the orderly stacking of the cut pieces in piles wherein the sawn end surfaces of the individual pieces are flush. This also permits the ready calculation of the volume of the logs in a given pile, since, given that the log lengths are known and substantially the same or constant, the volumes are essentially functions of the diameters.

Heretofore, the equipment used for measuring pulpwood log volumes has consisted of a measuring gauge or scale stick of triangular cross-section and having measuring indicia along its length at, for instance, one-inch intervals to provide log diameter classification means. The gauge has been wielded by a so-called scaler whose task entailed making mental notes of the classes into which the gross diameters of the several logs fell and the diameters of any incidental defective portions of the logs and to communicate such notes verbally to an assistant scaler. The assistant scaler's sole function has been to record what the scaler told him and, in instances where a log is partially or wholly defective, to record the diameter of the defective portion separately, for example under the heading of "Cull and Defective," so that the latter record could be deducted from the former record to arrive at a net volume figure.

It is, therefore, an object of the present invention to eliminate the need for assistant scalers and to equip scalers with an electrical apparatus simple to operate, compact and light enough to carry, and capable of assisting in measuring and recording numbers of logs measured, numbers of logs measured in particular log diameter classes, numbers of logs or pieces of logs measured and recorded as culls and defectives in particular cull diameter classes.

Broadly, the apparatus of the present invention is made up of two sub-assemblies which are electrically connected. The first sub-assembly or tabulating mechanism incorporates almost all of an electrical log tabulating circuit and an electrical cull or defective log tabulating circuit within a compact and portable unit which can, if desired, be carried slung from a scaler's shoulder, so that his hands are free of anything other than the measuring sub-assembly of his instrument. The log and cull tabulating circuits are substantially identical and can operate from the same power source, e.g., storage battery. Such circuits can include, in addition to the power source, circuit closing means, a total piece registering sub-circuit, and a plurality of diameter class recording sub-circuits and each circuit element is arranged in a series connection with another, while each of the plurality of diameter class recording sub-circuits is in a parallel connection with another of its kind. In turn, the total piece registering sub-circuits include electrical counting means and the diameter class recording sub-circuits include diode means, electrical counting means, and sub-circuit closing means which are serially connected to each other and, then, back to the power source. Thus, the present invention contemplates two electrical counting means, one to total logs and the other to total culls, for each diameter class confronting the scaler. Preferably, however, the log and cull tabulating circuits are interconnected electrically, so as to reduce parts and space requirements and, also, since it is not necessary to employ these circuits simultaneously, to be able to shut off one of the circuits when the other is turned on. This is simply accomplished, particularly when all the diameter class electrical counting means are, for instance, electromagnetic or solenoid-driven counters, by installing a commutator, e.g., a single pole, double throw switch, between the power source and the two tabulating circuits; by connecting to a single terminal the back ends of the two electromagnetic counters serving the same diameter class; by inserting only one diameter class recording sub-circuit closing means between each such terminal and the power source; and, by connecting all such sub-circuit closing means to the power source by means of a single conductor.

The second sub-assembly or measuring mechanism of the invention includes a staff or pole, a plurality of measuring indicia on the staff, and portions of the electrical log and cull tabulating circuits, such as their circuit or sub-circuit closing means, mounted on the staff. Preferably, the staff is not more than two feet in length, has a triangular cross-section, and is calibrated by the disposition of the measuring indicia at one-inch intervals along its length. Such disposition serves two useful purposes in that it affords sites for the diameter class recording sub-circuit closing means, e.g., two point make pushbuttons, between pairs of the indicia and it provides the scaler with log or cull diameter classifying means when he holds the staff across their sawn ends. Of course, all the sub-circuit closing means need not be attached to the staff; since few logs running as high as 20" in diameter are cut these days, the switches for the larger diameter classes can as well be put to one side, as on the first sub-assembly of the present apparatus. But, it is contemplated that a plurality of such switches will be disposed along the staff where they are most needed. Again the circuit closing means connecting the power source and the two tabulating circuits can be disposed on the staff.

Figure 2:
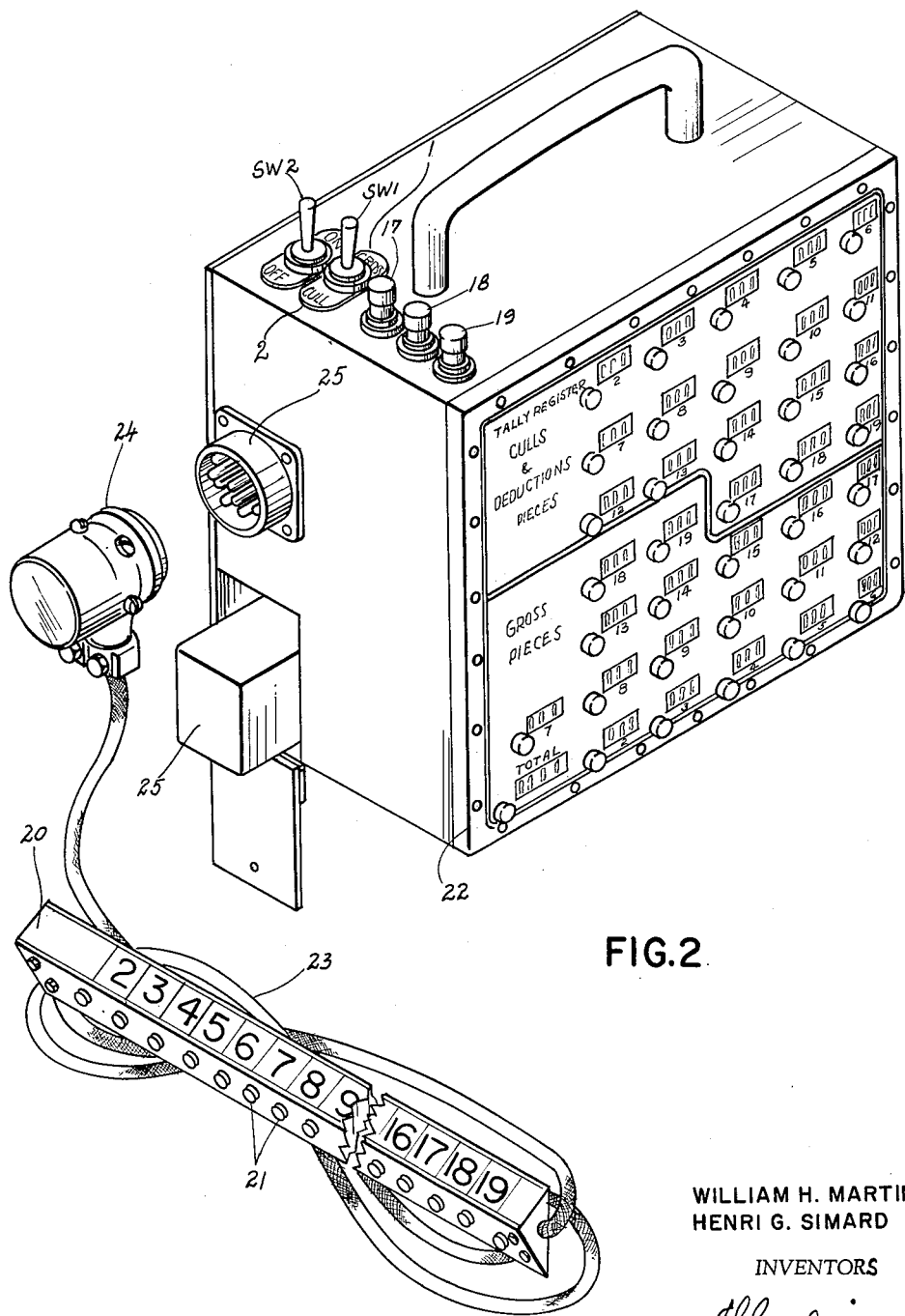

For a more complete understanding of the present invention, reference should be had to the attached drawings in which FIGURE 1 show a circuit diagram of a preferred embodiment of the instrument of the present invention; and FIGURE 2 illustrates the two sub-assemblies making up the instrument of the present invention.

As shown in FIGURE 2, the measuring staff 20 is triangular in cross-section, so that it presents a calibrated or numbered face, a control panel face equipped with pushbuttons 21 corresponding to each class defined by the calibrations, and a working face to be disposed across a sawn log or cull end, so that readings as to the diameter of the end can be taken from the calibrated face and electrically transmitted by the control panel pushbuttons to the tabulating mechanism 22 through cable 23, plug 24 and socket 25 connecting them. Of course, such transmissions can only occur when the tabulating mechanism 25 has been turned on at its master toggle switch Sw2 and when either the log or gross tabulating circuit or the cull tabulating circuit has been turned on at commutator toggle switch Sw1 by flipping it to position 2 or position 1, respectively, as shown in FIGURE 1.

As is also to be seen from FIGURE 1, when Sw2 and Sw1 are closed and the latter is on position 1 and when, for example, pushbutton switch S16 is closed by the scaler measuring a sawn log end of 16" diameter, current flows from the 67.5 volt dry cell 25 into R and T, a 200 ohm, 5 watt wire wound potentiometer and a 24 volt, 5 watt electromagnetic counter, respectively. The current in the coil of T causes it to register the number of the log the scaler is measuring as is to be seen through the window marked "Total" on the carrying case for mechanism 22 and by the flashing of the accompanying light, and the amount of such current is, of course, regulated by the setting of R. From R and T, the current passes down a conductor to which a plurality of diode means, e.g., S1–500 silicon rectifiers, are connected. However, it can pass through only one of such rectifiers; in this case, the one in that sub-circuit closed by the scaler's depression of pushbuttons S16 on staff 20. Thence, it passes through the coil of Gr16, a 24 volt, 5 watt electromagnetic counter for log diameter class recording sub-circuit number 16, causing such counter to record the log the scaler is measuring in the class in which the log's diameter places it, as is to be seen through the window marked "16" on the lower "Gross Pieces" half, of the carrying case for mechanism 22 and on the accompanying flashing light. The use of such lights or other signalling means is, of course, optional. Once the current passes Gr16, it flows past S16 and returns to the dry cell to complete the circuit and to place the instrument in readiness for the next measurement employing any of the pushbuttons S2 to S19 and their corresponding sub-circuits.

What is claimed is:

An electrical apparatus for the volumetric measurement of pulpwood comprising a portable instrument box and a portable staff adapted for manual disposition across log and cull diameters and connected to the instrument box solely by electrical means, said means extending to link electrical circuit elements in the instrument box and on the staff and to permit the registration of volumetric measurements of pulpwood in the instrument box when the staff is manually disposed across log and cull diameters and the electrical circuit elements thereon are manually operated, the instrument box having disposed therein a log tabulating circuit including a dry cell, circuit closing means, a total piece registering sub-circuit including an electromagnetic counting means, and a plurality of diameter class recording sub-circuits each including diode means, electrical counting means, and sub-circuit closing means and a cull tabulating circuit which is substantially identical in components to the log tabulating circuit, and the staff having disposed thereon log and cull diameter measuring indicia disposed at intervals along the staff and manually operable diameter class recording sub-circuit closing means disposed between pairs of the measuring indicia along the staff.

References Cited by the Examiner
UNITED STATES PATENTS

| | | | |
|---|---|---|---|
| 2,708,368 | 5/55 | Kolich | 73—432 |
| 2,865,104 | 12/58 | Hensoldt | 235—92 |
| 2,919,064 | 12/59 | Lange | 235—92 |

MALCOLM A. MORRISON, *Primary Examiner.*

WALTER W. BURNS, JR., *Examiner.*